United States Patent
Abe

(10) Patent No.: US 12,203,010 B2
(45) Date of Patent: Jan. 21, 2025

(54) TRANSPARENT SOLVENT-BASED ACRYLIC PRESSURE-SENSITIVE ADHESIVE AGENT AND ADHESIVE FILM

(71) Applicant: 3M INNOVATIVE PROPERTIES COMPANY, St. Paul, MN (US)

(72) Inventor: Hidetoshi Abe, Yamagata (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 249 days.

(21) Appl. No.: 17/765,989

(22) PCT Filed: Oct. 14, 2020

(86) PCT No.: PCT/IB2020/059615
§ 371 (c)(1),
(2) Date: Apr. 1, 2022

(87) PCT Pub. No.: WO2021/079229
PCT Pub. Date: Apr. 29, 2021

(65) Prior Publication Data
US 2022/0363961 A1   Nov. 17, 2022

(30) Foreign Application Priority Data
Oct. 24, 2019   (JP) .................. 2019-193611

(51) Int. Cl.
*C09J 133/08* (2006.01)
*C09J 7/38* (2018.01)

(52) U.S. Cl.
CPC ............ *C09J 133/08* (2013.01); *C09J 7/385* (2018.01); *C09J 2301/302* (2020.08); *C09J 2433/00* (2013.01)

(58) Field of Classification Search
None
See application file for complete search history.

(56) References Cited

U.S. PATENT DOCUMENTS

| | | |
|---|---|---|
| 6,448,339 B1 | 9/2002 | Tomita |
| 6,720,387 B1 | 4/2004 | Stark et al. |
| 6,800,680 B2 | 10/2004 | Stark et al. |
| 7,407,998 B2 | 8/2008 | Yang et al. |
| 7,927,703 B2 | 4/2011 | Xia et al. |
| 8,410,218 B2 | 4/2013 | Abe et al. |
| 2004/0202879 A1 | 10/2004 | Xia et al. |
| 2006/0069189 A1 | 3/2006 | Yang et al. |
| 2006/0074161 A1 | 4/2006 | Yang et al. |
| 2006/0159915 A1 | 7/2006 | Chang et al. |
| 2006/0246296 A1 | 11/2006 | Xia et al. |
| 2008/0306195 A1 | 12/2008 | Yang et al. |
| 2010/0055418 A1 | 3/2010 | Takamatsu |
| 2011/0177329 A1 | 7/2011 | Xia et al. |
| 2018/0044555 A1 | 2/2018 | Kigami et al. |

FOREIGN PATENT DOCUMENTS

| | | |
|---|---|---|
| EP | 2501769 B1 | 1/2015 |
| JP | 06049425 A | 2/1994 |
| JP | 07084582 B2 | 9/1995 |
| JP | 2934398 B2 | 8/1999 |
| JP | 2001115105 A | 4/2001 |
| JP | 2001172578 A | 6/2001 |
| JP | 4073293 B2 | 4/2008 |
| JP | 2008120970 A | 5/2008 |
| JP | 4325951 B2 | 9/2009 |
| JP | 2011-219602 | 11/2011 |
| JP | 2012021142 A | 2/2012 |
| JP | 5091424 B2 | 12/2012 |
| JP | 5347810 B2 | 11/2013 |
| JP | 2013-253160 | 12/2013 |
| JP | 5611129 B2 | 10/2014 |
| JP | 2014196377 A | 10/2014 |
| JP | 2014196442 A | 10/2014 |
| JP | 5651158 B2 | 1/2015 |
| JP | 5721537 B2 | 5/2015 |
| JP | 5800463 B2 | 10/2015 |
| JP | 2018058915 A | 4/2018 |
| JP | 6411127 B2 | 10/2018 |
| JP | 2018199827 A | 12/2018 |
| JP | 2019-073640 | 5/2019 |
| KR | 20060084399 A | 7/2006 |
| KR | 20180113917 A | 10/2018 |
| WO | 2011033844 A1 | 3/2011 |
| WO | 2013074446 A1 | 5/2013 |
| WO | 2012-128294 | 7/2014 |

OTHER PUBLICATIONS

International Search Report for PCT International Application No. PCT/IB2020/059615 mailed on Jan. 22, 2021, 4 pages.
Wahdat, Film formation of Aqueous Dispersions of Ionically cross-linked pressure sensitive adhesives studied with forster resonance energy transfer, Doctoral Thesis, Approved By The Faculty Of Natural And Materials Sciences, Clausthal University of Technology, Apr. 26, 2019, 126 pages.

*Primary Examiner* — Cheng Yuan Huang
(74) *Attorney, Agent, or Firm* — Jeffrey M. Olofson

(57) ABSTRACT

A transparent solvent-based acrylic pressure-sensitive adhesive agent is described. Such agent contains: an adhesive (meth)acrylic polymer having a weight average molecular weight of 350000 or less; a high Tg (meth)acrylic polymer having a glass transition temperature of 40° C. or higher; a covalent bonding crosslinking agent that can form a covalent bond with the adhesive (meth)acrylic polymer; and at least one type of non-covalent bonding crosslinking agent selected from the group consisting of a benzotriazole compound, a piperidyl compound having at least two piperidyl groups, and an aluminum chelate compounds. Such solvent-based adhesive agent may exhibit a high constant load shear peeling force and maintain good appearance for an adhesive article to which it has been applied.

9 Claims, 1 Drawing Sheet

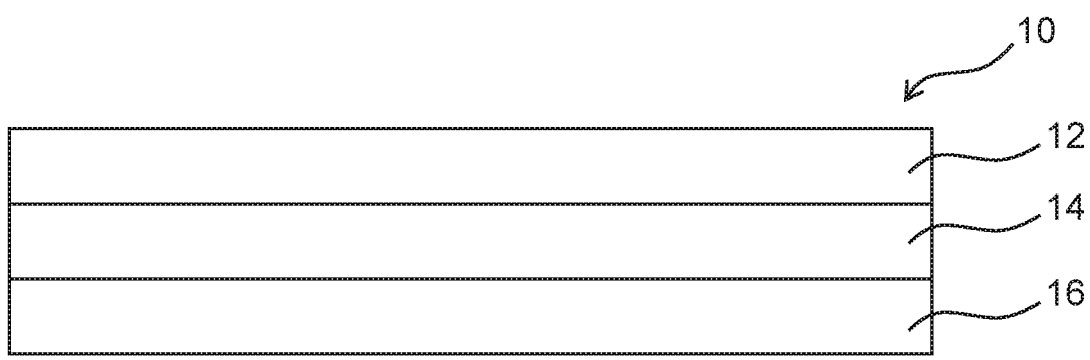

TRANSPARENT SOLVENT-BASED ACRYLIC PRESSURE-SENSITIVE ADHESIVE AGENT AND ADHESIVE FILM

TECHNICAL FIELD

The present disclosure relates to a transparent solvent-based acrylic pressure-sensitive adhesive agent and an adhesive film.

BACKGROUND ART

Adhesive materials in which a pressure-sensitive adhesive layer is provided on a substrate (e.g., a polymer film or paper), such as marking films, decorative films, or decorative sheets, are used in vehicles, buildings, traffic signs, packaging materials, signboards, and the like. Pressure-sensitive adhesive layers of these films or sheets are formed on a substrate by coating a pressure-sensitive adhesive agent on the substrate or by transferring a pressure-sensitive adhesive layer formed on another support with use of a pressure-sensitive adhesive agent.

Patent Document 1 (JP 2008-120970 A) describes "an acrylic adhesive agent obtained by copolymerizing a polymerizable composition containing an alkyl (meth)acrylate monomer (a1) and a copolymerizable functional group-containing unsaturated monomer (a2) as main components; the acrylic adhesive agent comprising 100 parts by weight of an acrylic copolymer (A) having a weight average molecular weight from 100000 to 300000, from 25 to 67 parts by weight of a solvent (B), from 30 to 60 parts by weight of tackifying resin (C), from 1.2 to 1.4 parts by weight of an epoxy group-containing crosslinking agent (D), and from 1.8 to 2.2 parts by weight of metal chelate-based crosslinking agent (E).

Patent Document 2 (JP 5540219 B) describes "an adhesive agent composition comprising components (A) and (B) below: (A) an acrylic polymer having a weight average molecular weight (Mw) of 350000 or less obtained by copolymerizing monomers (a-1) to (a-4) below: (a-1) from 60 to 96 mass % of alkyl (meth)acrylate, (a-2) from 0.01 to 5 mass % of hydroxyalkyl(meth)acrylate, (a-3) from 3 to 30 mass % of vinyl carboxylate, and (a-4) from 0.1 to 10 mass % vinyl group-containing acid anhydride; and (B) an isocyanate-based crosslinking agent".

SUMMARY OF INVENTION

Technical Problem

To reduce raw material costs and environmental burden caused by use of a solvent, studies have been conducted for allowing a solvent-based pressure-sensitive adhesive agent to have a high solid content. For the high solid content solvent-based pressure-sensitive adhesive agent, an adhesive polymer having a relatively low molecular weight is used to avoid excessive increase of a viscosity of the adhesive agent from the perspectives of coatability and ease of handling.

However, use of an adhesive polymer having a low molecular weight acts disadvantageously on some adhesive characteristics of a formed pressure-sensitive adhesive layer, such as constant load shear peeling force. Therefore, when such a solvent-based pressure-sensitive adhesive agent having a high solid content is used for purposes or in a location where shear force is applied along a plane (e.g., in a direction of gravitational force) of the pressure-sensitive adhesive layer, such as wallpaper, posters, and graphic films, these articles may be peeled off or may fall off.

Meanwhile, after the adhesive article is applied to an adherend, because of shrinkage of the substrate over time, the adhesive agent may be seen slightly squeezed out from the substrate when observing the surface of the adhesive article that is applied onto the adherend. At this time, in a case where the adhesive agent is colored to be white, black, or the like for example, the squeezed out portion is noticeable and good appearance thereof may be deteriorated.

The present disclosure provides a solvent-based pressure-sensitive adhesive agent which exhibits a high constant load shear peeling force and by which good appearance can be maintained of an adhesive article, to which the solvent-based pressure-sensitive adhesive agent has been applied.

Solution to Problem

An embodiment of the present disclosure provides a transparent solvent-based acrylic pressure-sensitive adhesive agent containing an adhesive (meth)acrylic polymer having a weight average molecular weight of 350000 or less; a high Tg (meth)acrylic polymer having a glass transition temperature of 40° C. or higher; a covalent bonding crosslinking agent that can form a covalent bond with the adhesive (meth)acrylic polymer; and at least one type of non-covalent bonding crosslinking agent selected from the group consisting of a benzotriazole compound, a piperidyl compound having at least two piperidyl groups, and an aluminum chelate compound.

Another embodiment of the present disclosure provides: an adhesive film having a substrate layer and a transparent pressure-sensitive adhesive layer provided on the substrate layer, the transparent pressure-sensitive adhesive layer containing a reaction product of a transparent acrylic pressure-sensitive adhesive agent containing: an adhesive (meth)acrylic polymer having a weight average molecular weight of 350000 or less; a high Tg (meth)acrylic polymer having a glass transition temperature of 40° C. or higher; a covalent bonding crosslinking agent that can form a covalent bond with the adhesive (meth)acrylic polymer; and at least one type of non-covalent bonding crosslinking agent selected from the group consisting of a benzotriazole compound, a piperidyl compound having at least two piperidyl groups, and an aluminum chelate compound.

Advantageous Effects of Invention

The transparent solvent-based acrylic pressure-sensitive adhesive agent of the present disclosure can form a pressure-sensitive adhesive layer exhibiting a high constant load shear peeling force. Furthermore, because the pressure-sensitive adhesive layer is transparent, good appearance of an adhesive film having the pressure-sensitive adhesive layer can be maintained.

Note that the above descriptions should not be construed to be a disclosure of all of the embodiments and benefits of the present disclosure.

BRIEF DESCRIPTION OF DRAWINGS

FIG. 1 is a schematic cross-sectional view of an adhesive film of one embodiment.

DESCRIPTION OF EMBODIMENTS

Hereinafter, representative embodiments of the present invention will be described in more detail for the purpose of illustration, but the present invention is not limited to these embodiments.

In the present disclosure, the term "(meth)acryl" refers to acryl or methacryl, and the term "(meth)acrylate" refers to acrylate or methacrylate.

In the present disclosure, "pressure sensitive adhesion" refers to the characteristic of a material or composition that is permanently adhesive in the temperature range of usage, such as from 0° C. to 50° C., and that adheres to various surfaces with light pressure and does not exhibit a phase change (from liquid to solid).

A transparent solvent-based acrylic pressure-sensitive adhesive agent of an embodiment contains: an adhesive (meth)acrylic polymer having a weight average molecular weight of approximately 350000 or less; a high Tg (meth)acrylic polymer having a glass transition temperature of approximately 40° C. or higher; a covalent bonding crosslinking agent that can form a covalent bond with the adhesive (meth)acrylic polymer; and at least one type of non-covalent bonding crosslinking agent selected from the group consisting of a benzotriazole compound, a piperidyl compound having at least two piperidyl groups (hereinafter, simply referred to as "piperidyl compound" in the present disclosure), and an aluminum chelate compound.

While not wishing to be bound to any particular theory, it is presumed that the reason for the transparent solvent-based acrylic pressure-sensitive adhesive agent of the present disclosure exhibiting a high constant load shear peeling force is as follows. In the pressure-sensitive adhesive layer formed by using the transparent solvent-based acrylic pressure-sensitive adhesive agent of the present disclosure, a covalent bonding crosslink, formed by a reaction between a covalent bonding crosslinking agent and an adhesive (meth)acrylic polymer having a weight average molecular weight of approximately 350000 or less, that is, a low molecular weight, and having a relatively short polymer backbone; and a non-covalent bonding crosslink, formed between a particular non-covalent bonding crosslinking agent and the adhesive (meth)acrylic polymer or a high Tg (meth)acrylic polymer, coexist. The covalent bonding crosslink imparts basic cohesive force to the pressure-sensitive adhesive layer and ensures viscoelastic characteristics required for the pressure-sensitive adhesive layer. Furthermore, while an excessively high cohesive force tends to make the pressure-sensitive adhesive layer hard and cause interfacial peeling between the adherend surface and the pressure-sensitive adhesive layer and thus disadvantageously affects the constant load shear peeling force, the relatively short polymer backbone of the adhesive (meth)acrylic polymer suppresses excessive increase of the cohesive force resulted from entanglement of the polymer chains. Meanwhile, the non-covalent bonding crosslink is a crosslink weaker than the covalent bonding crosslink in a manner that a part of the non-covalent bonding crosslink is temporarily cut off when the pressure-sensitive adhesive layer is deformed and then formed again at the same place or a different place. Therefore, by repeating the cutting and the re-forming of the non-covalent bonding crosslink in the condition where a constant shear force is applied to the pressure-sensitive adhesive layer, the macro cohesive failure can be suppressed in the viewpoint of the pressure-sensitive adhesive layer as a whole. As described above, it is conceived that coexistence of the two crosslinking modes, which are the covalent bonding crosslink and the non-covalent bonding crosslink, and the relatively short polymer backbone impart a high constant load shear peeling force to the pressure-sensitive adhesive layer formed by using the transparent solvent-based acrylic pressure-sensitive adhesive agent of the present disclosure.

The adhesive (meth)acrylic polymer is a polymer that exhibits tackiness at an operating temperature (e.g., 5° C., 10° C., 15° C., 20° C., or 25° C.) and that imparts pressure-sensitive adhesiveness to a pressure-sensitive adhesive agent. The weight average molecular weight of the adhesive (meth)acrylic polymer is approximately 350000 or less. In some embodiments, the weight average molecular weight of the adhesive (meth)acrylic polymer is approximately 100000 or greater, approximately 150000 or greater, or approximately 200000 or greater but approximately 330000 or less, approximately 320000 or less, or approximately 300000 or less. The weight average molecular weight in the present disclosure means a molecular weight obtained by GPC, based on calibration with polystyrene standard.

In one embodiment, the adhesive (meth)acrylic polymer is a carboxy group-containing (meth)acrylic polymer. The carboxy group-containing (meth)acrylic polymer contains a monoethylenically unsaturated monomer as a main component and obtained by copolymerizing the monoethylenically unsaturated monomer and a carboxy group-containing monoethylenically unsaturated monomer (carboxy group-containing monoethylenically unsaturated monomer).

The monoethylenically unsaturated monomer is a main component of the polymer and generally includes aromatic vinyl monomers, such as styrene, α-methylstyrene, and vinyl toluene; vinyl esters such as vinyl acetate; and unsaturated nitriles, such as acrylonitrile and methacrylonitrile; as well as those represented by the formula $CH_2=CR^1COOR^2$ (in the formula, $R^1$ is hydrogen or a methyl group, and $R^2$ is a straight-chain, cyclic, or branched alkyl group, a phenyl group, an alkoxy alkyl group, a phenoxy alkyl group, a hydroxy alkyl group, or a cyclic ether group). Examples of the monoethylenically unsaturated monomer represented by the formula $CH_2=CR^1COOR^2$ include straight-chain alkyl (meth)acrylates, such as methyl (meth)acrylate, ethyl (meth)acrylate, n-butyl (meth)acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate, and dodecyl (meth)acrylate; alicyclic (meth)acrylates, such as cyclohexyl (meth)acrylate and isobornyl (meth)acrylate; phenoxyalkyl (meth)acrylates, such as phenoxyethyl (meth)acrylate; alkoxyalkyl (meth)acrylates, such as methoxylpropyl (meth)acrylate and 2-methoxybutyl (meth)acrylate; hydroxyalkyl (meth)acrylates, such as 2-hydroxyethyl (meth)acrylate, 2-hydroxypropyl (meth)acrylate, and 4-hydroxybutyl (meth)acrylate; cyclic ether-containing (meth)acrylates, such as glycidyl (meth)acrylate and tetrahydrofurfuryl (meth)acrylate; and the like. If needed, one type or two or more types of the monoethylenically unsaturated monomers can be used as the monoethylenically unsaturated monomer.

Examples of the carboxy group-containing monoethylenically unsaturated monomer include unsaturated monocarboxylic acids, such as acrylic acid, methacrylic acid, and crotonic acid; unsaturated dicarboxylic acids, such as itaconic acid, fumaric acid, citraconic acid, and maleic acid; ω-carboxy polycaprolactone monoacrylate; phthalic acid monohydroxyethyl (meth)acrylate; β-carboxyethyl acrylate; 2-(meth)acryloyl oxyethyl succinic acid; 2-(meth)acryloyl oxyethyl hexahydrophthalic acid; and the like.

The carboxy group-containing (meth)acrylic polymer can be obtained by, for example, subjecting approximately 85 parts by mass or greater, approximately 90 parts by mass or greater, or approximately 92 parts by mass or greater, but approximately 99.5 parts by mass or less, approximately 99 parts by mass or less, or approximately 98 parts by mass or less, of the monoethylenically unsaturated monomer; and approximately 0.5 parts by mass or greater, approximately 1 part by mass or greater, or approximately 2 parts by mass or greater, but approximately 15 parts by mass or less, approximately 10 parts by mass or less, or approximately 8 parts by mass or less, of the carboxy group-containing monoethylenically unsaturated monomer to copolymerization.

In some embodiments, the glass transition temperature (Tg) of the adhesive (meth)acrylic polymer is approximately −30° C. or lower, approximately −35° C. or lower, or approximately −40° C. or lower, but approximately −80° C. or higher, approximately −70° C. or higher, or approximately −60° C. or higher. By setting the Tg to be within the range described above, cohesive force and initial adhesivity can be imparted to the pressure-sensitive adhesive layer.

The glass transition temperature (Tg) of the adhesive (meth)acrylic polymer can be determined as a calculated glass transition temperature by using the following Fox equation (Fox, T. G., Bull. Am. Phys. Soc., 1 (1956), p. 123) taking each polymer as being obtained by copolymerization of n types of monomers.

$$\frac{1}{Tg + 273.15} = \sum_{i=1}^{n}\left(\frac{X_i}{Tg_i - 273.15}\right) \quad \text{[Equation 1]}$$

In the equation, $Tg_i$ is the glass transition temperature (° C.) of homopolymer of a component i, $X_i$ is the mass fraction of the monomer of the component i added during polymerization, and i is a natural number of 1 to n.

$$\sum_{i=1}^{n} X_i = 1 \quad \text{[Equation 2]}$$

The high Tg (meth)acrylic polymer is a polymer that modifies or adjusts viscoelastic characteristics of the pressure-sensitive adhesive layer by combining with the adhesive (meth)acrylic polymer. The glass transition temperature (Tg) of the high Tg (meth)acrylic polymer is approximately 40° C. or higher. In some embodiments, the glass transition temperature of the high Tg (meth)acrylic polymer is approximately 45° C. or higher, approximately 50° C. or higher, or approximately 55° C. or higher, but approximately 150° C. or lower, approximately 135° C. or lower, or approximately 120° C. or lower. The glass transition temperature of the high Tg (meth)acrylic polymer can be also determined by using the Fox equation in the same manner as for the adhesive (meth)acrylic polymer.

In one embodiment, preferably, the high Tg (meth)acrylic polymer is an amino group-containing (meth)acrylic polymer and is an amino group-containing (meth)acrylic polymer containing no monomer unit derived from an aromatic vinyl monomer (hereinafter, also referred to as "amino group-containing non-aromatic (meth)acrylic polymer" in the present disclosure). The amino group-containing (meth) acrylic polymer, especially the amino group-containing (meth)acrylic polymer containing no monomer unit derived from an aromatic vinyl monomer, achieves excellent miscibility with a carboxy group-containing (meth)acrylic polymer.

The amino group-containing (meth)acrylic polymer contains a monoethylenically unsaturated monomer as a main component and can be obtained by copolymerizing the monoethylenically unsaturated monomer and an amino group-containing unsaturated monomer. The amino group-containing (meth)acrylic polymer containing no monomer unit derived from an aromatic vinyl monomer (amino group-containing non-aromatic (meth)acrylic polymer) is a substance that does not contain an aromatic vinyl monomer as a constituent of the polymer, among amino group-containing (meth)acrylic polymers. It is conceived that the amino group-containing (meth)acrylic polymer, especially the amino group-containing non-aromatic (meth)acrylic polymer, also contributes to enhancement of cohesive force of the pressure-sensitive adhesive layer by interacting with the carboxy group-containing (meth)acrylic polymer.

The copolymerization of the amino group-containing non-aromatic (meth)acrylic polymer is specifically described below. The monoethylenically unsaturated monomer used in the copolymerization of the amino group-containing non-aromatic (meth)acrylic polymer is the same as in the case of the carboxy group-containing (meth)acrylic polymer except an aromatic vinyl monomer, and as needed, one type or two or more types of monoethylenically unsaturated monomers can be used. The aromatic vinyl monomer includes styrene, α-methylstyrene, vinyl toluene, vinyl naphthalene, vinyl anthracene, vinyl anthraquinone, (meth) acrylamides of aromatic amine, (meth)acrylates of hydroxy group-containing aromatic compounds, and the like. Examples of the aromatic amine include aniline, benzylamine, naphthylamine, amino anthracene, amino anthraquinone, and derivatives of these. Examples of the hydroxy group-containing aromatic compound include hydroxy group-containing compounds corresponding to the aromatic amines described above.

Examples of the amino group-containing unsaturated monomer include dialkylaminoalkyl (meth)acrylates, such as N,N-dimethylaminoethyl acrylate (DMAEA) and N,N-dimethylaminoethyl methacrylate (DMAEMA); dialkylaminoalkyl (meth)acrylamides, such as N,N-dimethylaminopropyl acrylamide (DMAPAA) and N,N-dimethylaminopropyl methacrylamide; dialkylaminoalkyl vinyl ethers, such as N,N-dimethylaminoethyl vinyl ethers and N,N-diethylaminoethyl vinyl ethers; and the like. As needed, one type or two or more types of the amino group-containing unsaturated monomers can be used as the amino group-containing unsaturated monomers.

The amino group-containing non-aromatic (meth)acrylic polymer can be obtained by, for example, subjecting approximately 80 parts by mass or greater, approximately 85 parts by mass or greater, or approximately 90 parts by mass or greater, but approximately 99.5 parts by mass or less, approximately 99 parts by mass or less, or approximately 97 parts by mass or less, of the monoethylenically unsaturated monomer; and approximately 0.5 parts by mass or greater, approximately 1 part by mass or greater, or approximately 3 parts by mass or greater, but approximately 20 parts by mass or less, approximately 15 parts by mass or less, or approximately 10 parts by mass or less, of the amino group-containing unsaturated monomer to copolymerization.

The weight average molecular weight of the high Tg (meth)acrylic polymer is not particularly limited and, for example, can be approximately 1000 or greater, approximately 5000 or greater, or approximately 10000 or greater, but approximately 200000 or less, approximately 100000 or less, or approximately 80000 or less.

In some embodiments, the transparent solvent-based acrylic pressure-sensitive adhesive agent contains approximately 1 part by mass or greater, approximately 2 parts by mass or greater, or approximately 3 parts by mass or greater, but approximately 20 parts by mass or less, approximately 18 parts by mass or less, or approximately 16 parts by mass or less, of the high Tg (meth)acrylic polymer, per 100 parts by mass of the adhesive (meth)acrylic polymer.

The copolymerization of the carboxy group-containing (meth)acrylic polymer and the amino group-containing non-aromatic (meth)acrylic polymer is preferably performed by radical polymerization, and publicly known polymerization methods, such as solution polymerization, suspension polymerization, emulsion polymerization, and bulk polymerization, can be used. As an initiator, an organic peroxide, such as benzoyl peroxide, lauroyl peroxide, or bis(4-tert-butylcyclohexyl)peroxydicarbonate; or an azo-based polymerization initiator, such as 2,2'-azobisisobutyronitrile, 2,2'-azobis(2-methylbutyronitrile), dimethyl-2,2'-azobis(2-methylpropionate), 4,4'-azobis(4-cyanovalerianic acid), or 2,2'-azobis(2,4-dimethylvaleronitrile) (AVN), can be used. The used amount of the initiator is typically approximately 0.01 parts by mass or greater, or approximately 0.05 parts by mass or greater, but approximately 5 parts by mass or less, or approximately 3 parts by mass or less, per 100 parts by mass of the monomer mixture.

In another embodiment, the adhesive (meth)acrylic polymer is an amino group-containing non-aromatic (meth)acrylic polymer, and the high Tg (meth)acrylic polymer is a carboxy group-containing (meth)acrylic polymer.

The covalent bonding crosslinking agent is not particularly limited as long as the covalent bonding crosslinking agent can form a covalent bond with the adhesive (meth)acrylic polymer and can form a crosslink between polymer chains of the adhesive (meth)acrylic polymer. For example, in the case where the adhesive (meth)acrylic polymer is a carboxy group-containing (meth)acrylic polymer, examples of the covalent bonding crosslinking agent include di- or higher-functional compounds having a hydroxy group, an amino group, an epoxy group, an aziridine group, an isocyanato group, and the like.

In an embodiment where the adhesive (meth)acrylic polymer is a carboxy group-containing (meth)acrylic polymer, the covalent bonding crosslinking agent may be at least one type selected from the group consisting of an epoxy crosslinking agent and a bisamide crosslinking agent. Examples of the epoxy crosslinking agent include N,N,N',N'-tetraglycidyl-1,3-benzenedi(methanamine), such as TETRAD-X (available from Mitsubishi Gas Chemical Company, Inc., Chiyoda-ku, Tokyo, Japan), E-AX, and E-5XM (available from Soken Chemical & Engineering Co., Ltd., Toshima-ku, Tokyo, Japan); N,N'-(cyclohexane-1,3-diylbismethylene)bis(diglycidylamine), such as TETRAD-C (available from Mitsubishi Gas Chemical Company, Inc., Chiyoda-ku, Tokyo, Japan) and E-5C (available from Soken Chemical & Engineering Co., Ltd., Toshima-ku, Tokyo, Japan); and the like. Examples of the bisamide crosslinking agent include 1,1'-(1,3-phenylenedicarbonyl)bis(2-methylaziridine), 1,4-bis(ethyleneiminocarbonylamino)benzene, 4,4'-bis(ethyleneiminocarbonylamino)diphenylmethane, 1,8-bis(ethyleneiminocarbonylamino)octane, and the like.

In some embodiments, the transparent solvent-based acrylic pressure-sensitive adhesive agent contains approximately 0.01 parts by mass or greater, approximately 0.02 parts by mass or greater, or approximately 0.05 parts by mass or greater, but approximately 0.5 parts by mass or less, approximately 0.4 parts by mass or less, or approximately 0.3 parts by mass or less, of the covalent bonding crosslinking agent, per 100 parts by mass of the adhesive (meth)acrylic polymer.

The non-covalent bonding crosslinking agent is at least one type selected from the group consisting of a benzotriazole compound, a piperidyl compound having at least two piperidyl groups, and an aluminum chelate compound. The non-covalent bonding crosslinking agent is a compound forming a non-covalent bonding crosslink in the adhesive (meth)acrylic polymer or the high Tg (meth)acrylic polymer, and in the pressure-sensitive adhesive layer that is formed by using the transparent solvent-based acrylic pressure-sensitive adhesive agent of the present disclosure, a high constant load shear peeling force can be achieved from coexistence of the non-covalent bonding crosslink and the covalent bonding crosslink.

In one embodiment, the non-covalent bonding crosslinking agent is at least one type selected from the group consisting of a benzotriazole compound and a piperidyl compound having at least two piperidyl groups. While not wishing to be bound to any particular theory, it is conceived that a non-covalent bonding crosslink is formed between a nitrogen atom, constituting a triazole ring or a piperidine ring of the benzotriazole compound and the piperidyl compound, and a carbonyl group of the adhesive (meth)acrylic polymer or the high Tg (meth)acrylic polymer.

The benzotriazole compound is preferably a 2H-benzotriazole compound and more preferably has a substituted or unsubstituted hydroxyphenyl group at the 2-position. Because the 2H-benzotriazole compound has no substituents at the nitrogen atoms of the 1-position and the 3-position, the 2H-benzotriazole compound can advantageously form a non-covalent bonding crosslink. The 2H-benzotriazole compound having a substituted or unsubstituted hydroxyphenyl group at the 2-position has excellent miscibility with the adhesive (meth)acrylic polymer and the high Tg (meth)acrylic polymer.

The benzotriazole compound may be a benzotriazole compound that can be used as an ultraviolet absorbing agent (UVA). Use of a benzotriazole compound having ultraviolet absorbing properties can impart resistance to ultraviolet rays to the pressure-sensitive adhesive layer in addition to formation of the non-covalent bonding crosslink.

Examples of the benzotriazole compound include 2-(2H-benzotriazol-2-yl)-p-cresol, 2-(2H-benzotriazol-2-yl)-4-methylphenol, 2-(2H-benzotriazol-2-yl)-4-methyl-6-(straight-chain or branched)dodecylphenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2,2'-methylene-bis[6-(2H-benzotriazol-2-yl)-4-(1,1,3,3-tetramethylbutyl)phenol], and C7-9 branched or straight-chain alkyl esters of 3-(2H-benzotriazol-2-yl)-5-(1,1-dimethylethyl)-4-hydroxy-benzenepropanoic acid.

The piperidyl compound has at least two piperidyl groups, and the nitrogen atoms of these piperidyl groups participate in formation of the non-covalent bonding crosslink. The piperidyl compound is preferably a piperidyl compound in which piperidyl groups are bonded through divalent linking group(s) having 4 or more, 6 or more, or 8 or more carbon atoms. The piperidyl compound in which piperidyl groups are bonded through divalent linking group(s) having 4 or more, 6 or more, or 8 or more carbon atoms exhibits excellent miscibility with the adhesive (meth)acrylic polymer and the high Tg (meth)acrylic polymer.

The piperidyl compound may be a piperidyl compound that can be used as a hindered amine-based light stabilizer (HALS). Use of a hindered amine-based light stabilizer as the piperidyl compound can impart resistance to ultraviolet rays to the pressure-sensitive adhesive layer in addition to formation of the non-covalent bonding crosslink.

Examples of the piperidyl compound include bis(1,2,2,6,6-pentamethyl-4-piperidyl)sebacate; bis(2,2,6,6-tetramethyl-1-(octyloxy)-4-piperidyl)sebacate; bis(2,2,6,6-tetramethyl-4-piperidyl)sebacate; bis(1,2,2,6,6-pentamethyl-4-piperidyl)-[[3,5-bis(1,1-dimethylethyl)-4-hydroxyphenyl] methyl]butylmalonate; polyesters which have terminals capped with dimethyl and which is of butanedioic acid and 4-hydroxy-2,2,6,6-tetramethyl-1-piperidineethanol; tetrakis (1,2,2,6,6-pentamethyl-4-piperidyl)butane-1,2,3,4-tetracarboxylate; and tetrakis(2,2,6,6-tetramethyl-4-piperidyl)butane-1,2,3,4-tetracarboxylate.

In some embodiments, the transparent solvent-based acrylic pressure-sensitive adhesive agent contains approximately 0.1 parts by mass or greater, approximately 0.3 parts by mass or greater, or approximately 0.5 parts by mass or greater, but approximately 15 parts by mass or less, approximately 13 parts by mass or less, or approximately 11 parts by mass or less, of the non-covalent bonding crosslinking agent which is at least one type selected from the group consisting of a benzotriazole compound and a piperidyl compound, per 100 parts by mass of the adhesive (meth) acrylic polymer.

In another embodiment, the non-covalent bonding crosslinking agent is an aluminum chelate compound. While not wishing to be bound to any particular theory, it is conceived that a non-covalent bonding crosslink is formed between an aluminum cation released from the aluminum chelate compound; and a carbonyl group of the adhesive (meth)acrylic polymer or the high Tg (meth)acrylic polymer.

Examples of the aluminum chelate compound include aluminum tris(acetylacetonate), aluminum monoacetylacetonate bis(ethylacetoacetate), aluminum tris(ethylacetoacetate), and aluminum ethylacetoacetate diisopropylate.

In some embodiments, the transparent solvent-based acrylic pressure-sensitive adhesive agent contains approximately 0.01 parts by mass or greater, approximately 0.05 parts by mass or greater, or approximately 0.1 parts by mass or greater, but approximately 2 parts by mass or less, approximately 1.5 parts by mass or less, or approximately 1.0 part by mass or less, of the non-covalent bonding crosslinking agent which is an aluminum chelate compound, per 100 parts by mass of the adhesive (meth)acrylic polymer.

As long as the effects of the present invention are not impaired, the transparent solvent-based acrylic pressure-sensitive adhesive agent may contain fillers, antioxidants, thermal stabilizers, ultraviolet absorbers, tackifiers, and the like as other components.

Examples of the solvent contained in the transparent solvent-based acrylic pressure-sensitive adhesive agent include methanol, ethanol, hexane, toluene, acetone, methyl ethyl ketone, methyl isobutyl ketone, ethyl acetate, butyl acetate, and mixed solvents of these. As the solvent, a solvent containing a polar aprotic solvent, including ketones such as acetone, methyl ethyl ketone, and methyl isobutyl ketone; esters such as ethyl acetate and butyl acetate; or the like, can be advantageously used.

The transparent solvent-based acrylic pressure-sensitive adhesive agent can be obtained by mixing the adhesive (meth)acrylic polymer, the high Tg (meth)acrylic polymer, the covalent bonding crosslinking agent, the non-covalent bonding crosslinking agent, the solvent, and optional components by using a publicly known method.

In some embodiments, the solid content of the transparent solvent-based acrylic pressure-sensitive adhesive agent is approximately 40 mass % or greater, approximately 50 mass % or greater, or approximately 55 mass % or greater, but approximately 99 mass % or less, approximately 95 mass % or less, or approximately 90 mass % or less. The solid content includes the adhesive (meth)acrylic polymer, the high Tg (meth)acrylic polymer, the covalent bonding crosslinking agent, and the non-covalent bonding crosslinking agent, as well as other nonvolatile components that are optionally added. Since the adhesive (meth)acrylic polymer has a relatively low molecular weight and since a temporary crosslink is formed between the non-covalent bonding crosslinking agent and the adhesive (meth)acrylic polymer or the high Tg (meth)acrylic polymer, the transparent solvent-based acrylic pressure-sensitive adhesive agent exhibits thixotropy when shear force is applied before the formation of the covalent bonding crosslink. Therefore, even when the solid content is high, good coatability is achieved.

In some embodiments, the total light transmittance of the transparent solvent-based acrylic pressure-sensitive adhesive agent at the wavelength range of 400 to 700 nm is approximately 70% or greater, approximately 80% or greater, or approximately 90% or greater, but approximately 99% or less, approximately 97% or less, or approximately 95% or less, when measured in accordance with JIS K 7361-1:1997 (ISO 13468-1:1996).

In some embodiments, the viscosity of the transparent solvent-based acrylic pressure-sensitive adhesive agent is approximately 100 mPa·s or greater, approximately 300 mPa·s or greater, or approximately 500 mPa·s or greater, but approximately 50000 mPa·s or less, approximately 30000 mPa·s or less, or approximately 10000 mPa·s or less, when measured by using a B-type viscometer (rotational) in accordance with JIS Z 8803:2011 at 25° C.

An adhesive film can be formed by using the transparent solvent-based acrylic pressure-sensitive adhesive agent of the present disclosure. The adhesive film of one embodiment contains a substrate layer and a transparent pressure-sensitive adhesive layer provided on the substrate layer, and the transparent pressure-sensitive adhesive layer contains a reaction product of the solid content of the transparent solvent-based acrylic pressure-sensitive adhesive agent (transparent acrylic pressure-sensitive adhesive agent).

FIG. 1 is a schematic cross-sectional view of an adhesive film of one embodiment. An adhesive film 10 has a substrate layer 12 and a transparent pressure-sensitive adhesive layer 14 as well as a liner 16, which is optional.

The substrate layer may be a transparent material or may be formed by an opaque material or a colored material. As the substrate layer, for example, plastic films, such as polyethylene films, polypropylene films, polyester films, acrylic resin films, polycarbonate films, polyvinyl chloride films, polyvinylidene chloride films, polystyrene films, and polyamide films; paper, such as kraft paper, calendar paper, and laminated paper; metal thin plates or metal foils of aluminum, stainless steel, copper, and the like; and the like can be used.

The substrate layer and the transparent pressure-sensitive adhesive layer may be in contact directly, or another layer may be provided between these layers, and examples of such another layer include another adhesive layer, a coloring layer, a metal layer, a printed layer, a bulk layer, and the like. On the substrate layer, another layer, such as another adhesive layer, a coloring layer, a metal layer, a printed layer, a bulk layer, a surface-protecting layer, or a clear layer, may be laminated. The adhesive film may have another functional layer, such as a primer layer.

The adhesive film may have a liner on a surface of the transparent pressure-sensitive adhesive layer, on the opposite side relative to the substrate layer. Examples of the liner, which is an optional constituent, may include plastic materials, such as polyethylene, polypropylene, polyester, and cellulose acetate; papers; and papers coated with the plastic materials described above. These liners may have a surface that has been subjected to release treatment with silicone or the like.

The adhesive film can be produced by a publicly known method. For example, a transparent solvent-based acrylic pressure-sensitive adhesive agent is coated on a liner by knife coating, bar coating, or the like and dried to form a transparent pressure-sensitive adhesive layer. The transparent pressure-sensitive adhesive layer may be heated by using hot air, an oven, or the like during drying to allow the covalent bonding crosslinking agent to react. A substrate layer is laminated on the obtained transparent pressure-sensitive adhesive layer by dry lamination or the like to produce an adhesive film. The adhesive film can be produced also by directly coating and drying the transparent solvent-based acrylic pressure-sensitive adhesive agent on the substrate.

The transparent pressure-sensitive adhesive layer may be a solid, porous, or foam body. The adhesion face of the transparent pressure-sensitive adhesive layer may be flat or may have recesses and protrusions. In the adhesion face having recesses and protrusions, protrusions containing a reaction product of the transparent acrylic pressure-sensitive adhesive agent; and recesses that surround these protrusions are formed on the adhesion face of the transparent pressure-sensitive adhesive layer, and in a state of being adhered to an adherend, an adhesion face has communication passages formed between the adherend surface and the adhesion face, the communication passages being in communication with outer portions that are demarcated by the recesses. An example of the method for forming the adhesion face having recesses and protrusions will be described below.

A liner having a release face having a prescribed recesses and protrusions structure is prepared. On a release face of this liner, the transparent solvent-based acrylic pressure-sensitive adhesive agent is coated and, if needed, heated to form a transparent pressure-sensitive adhesive layer. By this, the recesses and protrusions structure (negative structure) of the liner is transferred to the face, which adjoins the liner, of the transparent pressure-sensitive adhesive layer (this serves as the adhesion face in the adhesive film), and an adhesion face having recesses and protrusions having the prescribed structure (positive structure) is formed on the adhesion face. As described above, the recesses and protrusions of the adhesion face are designed in advance so as to contain grooves capable of forming the communication passages when the protrusions adhere to the adherend.

The grooves of the transparent pressure-sensitive adhesive layer, provided that air bubbles can be prevented from remaining when the adhesive film is applied, may be grooves in a regular pattern in which grooves of a consistent shape are disposed on the adhesion face according to the regular pattern or may be grooves in an irregular pattern in which grooves of an inconsistent shape are disposed. In the case where a plurality of grooves are formed so as to be disposed substantially parallel to each other, the distance at which the grooves are disposed is preferably approximately 10 μm or greater but approximately 2000 μm or less. The depth of the grooves (distance from the adhesion face to the bottom of the groove measured in the direction of the substrate layer) is typically approximately 10 μm or greater but approximately 100 μm or less. The shape of the grooves is not particularly limited provided that the effect of the present invention is conserved. For example, the shape of the groove may be substantially rectangular (including trapezoidal), substantially semi-circular, or substantially semi-elliptical at the cross-sectional face of the groove in the direction perpendicular to the adhesion face.

In the adhesive film, thickness of each layer is not particularly limited. The thickness of the substrate layer can be, for example, approximately 5 μm or greater, approximately 10 μm or greater, or approximately 20 μm or greater, but approximately 500 μm or less, approximately 300 μm or less, or approximately 200 μm or less. The thickness of the transparent pressure-sensitive adhesive layer can be approximately 5 μm or greater, approximately 10 μm or greater, or approximately 20 μm or greater, but approximately 200 μm or less, approximately 100 μm or less, or approximately 50 μm or less. The thickness of the liner can be, typically, approximately 10 μm or greater or approximately 25 μm or greater, but approximately 500 μm or less or approximately 200 μm or less.

In one embodiment, the constant load shear peeling time of the adhesive film, in which the thickness of the transparent pressure-sensitive adhesive layer is from 25 μm to 45 μm, is longer than approximately 5 hours and preferably longer than 24 hours, under the condition of a temperature of 40° C. and a load of 1 kg in the case where the adhesive film is adhered to a 25 mm×25 mm adhesion region of an aluminum substrate. In the present disclosure, the measurement procedure and conditions of "constant load shear peeling time" are in accordance with "4. Constant Load Shear Peeling Force" described in Examples.

The adhesive film of the present disclosure can be used for vehicles, building materials including exterior walls and interior walls, traffic signs, packaging materials, signboards, and the like and particularly suitably used for purposes or in a location where shear stress is applied along a plane (e.g., in a direction of gravitational force) of the transparent pressure-sensitive adhesive layer.

EXAMPLES

In the following examples, specific embodiments of the present disclosure will be exemplified, but the present invention is not limited thereto. All "parts" and "percent" are based on mass unless otherwise specified.

Materials used in the present examples are shown in Table 1. In the present examples, the adhesive (meth)acrylic polymer is simply written as "adhesive polymer", and the high Tg (meth)acrylic polymer is simply written as "high Tg polymer".

TABLE 1

| Material | Composition or description[1] | Available from | $Tg^{2)}$ (° C.) | Molecular weight or weight average molecular weight (Mw) | Solvent | Solid content (mass %) |
|---|---|---|---|---|---|---|
| Tacky adhesive polymer 1 (ADH1) | 2EHA-BA-AA = 64:30:6 | (see Synthesis Example 1) | −57 | 300000 | EtOAc | 60 |

TABLE 1-continued

| Material | Composition or description[1] | Available from | Tg[2] (° C.) | Molecular weight or weight average molecular weight (Mw) | Solvent | Solid content (mass %) |
|---|---|---|---|---|---|---|
| Tacky adhesive polymer 2 (ADH2) | 2EHA-BA-AA = 64:30:6 | (see Synthesis Example 2) | −57 | 230000 | EtOAc | 60 |
| Tacky adhesive polymer 3 (ADH3) | 2EHA-BA-AA = 64:30:6 | (see Synthesis Example 3) | −57 | 350000 | EtOAc | 60 |
| Tacky adhesive polymer 4 (ADH4) | 2EHA-BA-AA = 64:30:6 | (see Synthesis Example 4) | −57 | 280000 | EtOAc | 60 |
| High Tg polymer 1 (HTP 1) | MMA-BMA-DMAEMA = 60:34:6 | (see Synthesis Example 5) | 63 | 68000 | EtOAc | 40 |
| Covalent bonding crosslinking agent 1 (CCL 1) | Epoxy-based crosslinking agent TETRAD-X Diluted to 5 mass % with MEK | Mitsubishi Gas Chemical Company, Inc. (Chiyoda-ku, Tokyo, Japan) | — | — | MEK | 5 |
| Covalent bonding crosslinking agent 2 (CCL 2) | Bisamide crosslinking agent 1,1'-(1,3-phenylenedicarbonyl)-bis(2-methylaziridine) | 3M Japan Limited. (Shinagawa-ku, Tokyo, Japan) | — | — | Toluene | 5 |
| Non-covalent bonding crosslinking agent 1 (NCL 1) | Tinuvin (trade name) 123 Piperidyl compound | BASF Japan (Minato-ku, Tokyo, Japan) | — | 737 | — | 100 |
| Non-covalent bonding crosslinking agent 2 (NCL 2) | Tinuvin (trade name) 99-2 Benzotriazole compound | BASF Japan (Minato-ku, Tokyo, Japan) | — | 451 | — | 100 |
| Non-covalent bonding crosslinking agent 3 (NCL 3) | Tinuvin (trade name) 292 Piperidyl compound | BASF Japan (Minato-ku, Tokyo, Japan) | — | 509 370 | — | 100 |
| Non-covalent bonding crosslinking agent 4 (NCL 4) | Curing agent AD-5A Aluminum tris(acetylacetonate) | Soken Chemical & Engineering Co., Ltd. (Toshima-ku, Tokyo, Japan) | — | — | Toluene | 5 |
| Release sheet 1 (L1) | SCW1034 Comply (trade name) Liner Surface structuration single side silicone-treated double-sided polyethylene laminated release sheet | 3M Japan Limited. (Shinagawa-ku, Tokyo, Japan) | — | — | — | — |

[1] 2EHA: 2-ethylhexyl acrylate; BA: butyl acrylate; AA: acrylic acid; MMA: methyl methacrylate; BMA: butyl methacrylate; DMAEMA: dimethylaminoethyl methacrylate; EtOAc: ethyl acetate; MEK: methyl ethyl ketone
[2] value calculated by using the Fox equation The structures of NCL 1 and NCL 3 (Tinuvin (trade name) 123 and Tinuvin (trade name) 292), which are piperidyl compounds, and NCL 2 (Tinuvin (trade name) 99-2), which is a benzotriazole compound, are shown below.

[Chemical Formula 1]

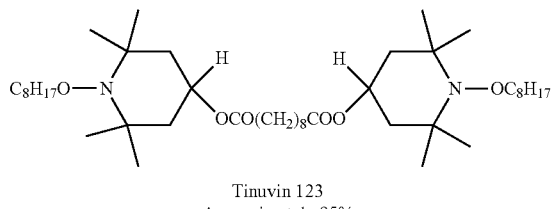

Tinuvin 123
Approximately 95%

[Chemical Formula 2]

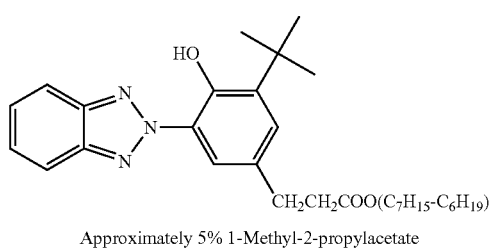

Approximately 5% 1-Methyl-2-propylacetate

[Chemical Formula 3]

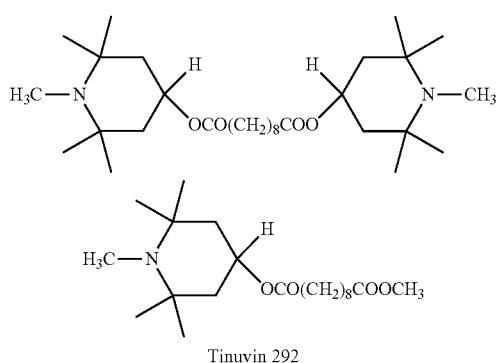

Tinuvin 292

Synthesis Example 1: Production of Adhesive Polymer 1 (ADH 1)

In 66.7 parts by mass of ethyl acetate, 64 parts by mass of 2-ethylhexyl acrylate (2EHA), 30 parts by mass of butyl acrylate (BA), and 6 parts by mass of acrylic acid (AA) were dissolved, and 0.5 parts by mass of dimethyl-2,2'-azobis(2-methylpropionate) (trade name: V-601, available from FUJIFILM Wako Pure Chemical Corporation (Osaka-shi, Osaka, Japan)) was added as a polymerization initiator. Thereafter, the mixture was reacted at 75° C. for 24 hours in a nitrogen atmosphere to prepare an ethyl acetate solution (solid content: 60%) of an adhesive polymer 1 (ADH 1). The weight average molecular weight (Mw) of ADH 1 was 300000, and the glass transition temperature (Tg) was −57° C. The Tg was determined by the Fox equation assuming that each polymer is formed by copolymerization of n types of monomers. The same applies to Synthesis Examples 2 to 5.

Synthesis Example 2: Production of Adhesive Polymer 2 (ADH 2)

In 66.7 parts by mass of ethyl acetate, 64 parts by mass of 2EHA, 30 parts by mass of BA, and 6 parts by mass of AA were dissolved, and 0.7 parts by mass of dimethyl-2,2'-azobis(2-methylpropionate) (trade name: V-601, available from FUJIFILM Wako Pure Chemical Corporation (Osaka-shi, Osaka, Japan)) was added as a polymerization initiator. Thereafter, the mixture was reacted at 75° C. for 24 hours in a nitrogen atmosphere to prepare an ethyl acetate solution (solid content: 60%) of an adhesive polymer 2 (ADH 2). The weight average molecular weight (Mw) of ADH 2 was 230000, and the glass transition temperature (Tg) was −57° C.

Synthesis Example 3: Production of Adhesive Polymer 3 (ADH 3)

In 66.7 parts by mass of ethyl acetate, 64 parts by mass of 2EHA, 30 parts by mass of BA, and 6 parts by mass of AA were dissolved, and 0.4 parts by mass of dimethyl-2,2'-azobis(2-methylpropionate) (trade name: V-601, available from FUJIFILM Wako Pure Chemical Corporation (Osaka-shi, Osaka, Japan)) was added as a polymerization initiator. Thereafter, the mixture was reacted at 75° C. for 24 hours in a nitrogen atmosphere to prepare an ethyl acetate solution (solid content: 60%) of an adhesive polymer 3 (ADH 3). The weight average molecular weight (Mw) of ADH 3 was 350000, and the glass transition temperature (Tg) was −57° C.

Synthesis Example 4: Production of Adhesive Polymer 4 (ADH 4)

In 66.7 parts by mass of ethyl acetate, 64 parts by mass of 2EHA, 30 parts by mass of BA, and 6 parts by mass of AA were dissolved, and 0.55 parts by mass of dimethyl-2,2'-azobis(2-methylpropionate) (trade name: V-601, available from FUJIFILM Wako Pure Chemical Corporation (Osaka-shi, Osaka, Japan)) was added as a polymerization initiator. Thereafter, the mixture was reacted at 75° C. for 24 hours in a nitrogen atmosphere to prepare an ethyl acetate solution (solid content: 60%) of an adhesive polymer 4 (ADH 4). The weight average molecular weight (Mw) of ADH 4 was 280000, and the glass transition temperature (Tg) was −57° C.

Synthesis Example 5: High Tg Polymer 1 (HTP 1)

In 150 parts by mass of ethyl acetate, 60 parts by mass of methyl methacrylate (MMA), 34 parts by mass of butyl methacrylate (BMA), and 6 parts by mass of dimethylaminoethyl methacrylate (DMAEMA) were dissolved, and 0.6 parts by mass of dimethyl-2,2-azobis(2-methylpropionate) (trade name: V-601, available from FUJIFILM Wako Pure Chemical Corporation (Osaka-shi, Osaka, Japan)) was added as a polymerization initiator. Thereafter, the mixture was reacted at 65° C. for 24 hours in a nitrogen atmosphere to prepare an ethyl acetate solution (solid content: 40%) of a high Tg polymer 1 (HTP 1). The weight average molecular weight (Mw) of HTP 1 was 68000, and the glass transition temperature (Tg) was 63° C.

Example 1

A transparent solvent-based acrylic pressure-sensitive adhesive agent containing the adhesive polymer 1 (ADH 1), the high Tg polymer 1 (HTP 1), the covalent bonding crosslinking agent (CCL 1), and the non-covalent bonding crosslinking agent 1 (NCL 1) was prepared. The mass ratio ADH 1:HTP 1:CCL 1:NCL 1, in terms of solid content, was 100:5.0:0.15:5.0. The solid content of the transparent solvent-based acrylic pressure-sensitive adhesive agent was 52 mass %. The transparent solvent-based acrylic pressure-sensitive adhesive agent was coated on the silicone-treated face of the release sheet 1 (L 1) by using a knife coater. The coated layer was dried at 95° C. for 5 minutes to obtain a transparent pressure-sensitive adhesive layer having the thickness of 39 μm. The transparent pressure-sensitive adhesive layer was transferred to a smooth surface of an embossed polyvinyl chloride film having the thickness of 170 μm to obtain an adhesive film of Example 1.

Examples 2 to 16 and Comparative Example 1 The adhesive films of Examples 2 to 16 and Comparative Example 1 were produced in the same manner as for the adhesive film of Example 1. The compositions of the transparent solvent-based acrylic pressure-sensitive adhesive agents used in the production of these adhesive films and the thicknesses of the transparent pressure-sensitive adhesive layer are shown in Table 2.

Evaluation Method

The characteristics of the adhesive films were evaluated according to the following methods.

1. Heat-Shrinkable Property

A test piece was produced by cutting an adhesive film into a 150 mm×150 mm square. The test piece was adhered on an aluminum plate in an environment at 23° C. by using a roller. The test piece was left in an environment at 23° C. for 24 hours. A cross-shaped cut was formed in the test piece by using a utility knife. The test piece was left in an oven at 65° C. for 48 hours. The amount of film shrinkage (mm) was measured by using a micrometer after the test piece was taken out, and the maximum value was recorded.

2. Re-Workability

A test piece was produced by cutting an adhesive film into a size of 300 mm in length and 210 mm in width. The test piece was adhered on a plate with melamine baking finish (available from Paltek Corporation (Hiratsuka-shi, Kanagawa, Japan)) at 23° C. using a squeegee. The test piece was peeled off at a high speed with hands. The case where the test piece was easily peeled off without deformation was evaluated as "Good", the case where the test piece was not deformed but the peeling was slow was evaluated as "Not good", and the case where strong tackiness was exhibited and it was difficult to peel off the test piece at a high speed was evaluated as "Poor".

3. Adhesive Force

A test piece was produced by cutting an adhesive film into a 150 mm in length×25 mm in width rectangle. The test piece was adhered on a phosphate-treated electrolytic zinc-coated steel sheet (SECC-P; thickness: 1 mm; available from Paltek Corporation (Hiratsuka-shi, Kanagawa, Japan)) at 20° C. The adhering method was in accordance with JIS Z 0237 8.2.3. The test piece was left at 20° C. for 24 hours. Using a tensile tester (Tensilon universal testing machine, model: RTC-1210A, available from A&D Company, Limited (Toshima-ku, Tokyo, Japan)), the adhesive force (N/25 mm) at the time of performing 90 degree peeling was measured at a peeling rate of 300 mm/min at a temperature of 20° C.

4. Constant Load Shear Peeling Force

A test piece was produced by cutting an adhesive film into a size of 150 mm in length×25 mm in width. To an aluminum substrate, 25 mm length of the test piece was adhered by using a squeegee and left in an environment at 20° C. for 24 hours. On a free end (part that was not adhered) of the test piece, a 1 kg weight was fixed, and the load was applied to the direction of 180 degrees relative to the aluminum substrate by placing the weight vertically downward. This was left in an environment at 40° C. for a maximum of 24 hours. The time took for the test piece to fall off from the aluminum substrate (constant load shear peeling time) was measured and recorded.

For the evaluation of the constant load shear peeling force, the case where the shear peeling time was 2 hours or less was evaluated as "Poor", the case where the shear peeling time was longer than 2 hours but 5 hours or less was evaluated as "Not good", the case where the shear peeling time was longer than 5 hours but 24 hours or less was evaluated as "Good", and the case where the shear peeling time was longer than 24 hours was evaluated as "Excellent".

The evaluation results for adhesive films of Example 1 to Example 16 and Comparative Example 1 are shown in Table 2.

TABLE 2

(part by mass in terms of solid content)

| | Adhesive polymer | | High Tg polymer | | Covalent bonding crosslinking agent | | Non-covalent bonding crosslinking agent | | Pressure sensitive adhesive layer Thickness | Heat-shrinkable property | Rework-ability | Adhesive force | Constant load shear peeling force | |
|---|---|---|---|---|---|---|---|---|---|---|---|---|---|---|
| | Type | (part by mass) | Type | (part by mass) | Type | (part by mass) | Type | (part by mass) | (μm) | (mm) | | (N/25 mm) | (hour) | Rating |
| Example 1 | ADH1 | 100 | HTP1 | 5.0 | CCL1 | 0.15 | NCL1 | 5.0 | 39 | 0.24 | Good | 18 | >24 | Excellent |
| Example 2 | ADH1 | 100 | HTP1 | 5.0 | CCL1 | 0.15 | NCL2 | 5.0 | 38 | 0.23 | Good | 24 | >24 | Excellent |
| Example 3 | ADH1 | 100 | HTP1 | 5.0 | CCL1 | 0.15 | NCL3 | 0.5 | 46 | 0.22 | Good | 21 | >24 | Excellent |
| Example 4 | ADH1 | 100 | HTP1 | 5.0 | CCL1 | 0.15 | NCL1 | 0.5 | 41 | 0.22 | Good | 19 | 8 | Good |
| Example 5 | ADH1 | 100 | HTP1 | 5.0 | CCL1 | 0.15 | NCL1 | 3.0 | 38 | 0.22 | Good | 17 | 14 | Good |
| Example 6 | ADH1 | 100 | HTP1 | 5.0 | CCL1 | 0.15 | NCL1 | 10.0 | 41 | 0.24 | Good | 17 | 11 | Good |
| Example 7 | ADH1 | 100 | HTP1 | 5.0 | CCL1 | 0.15 | NCL4 | 0.5 | 42 | 0.18 | Good | 21 | >24 | Excellent |
| Example 8 | ADH1 | 100 | HTP1 | 5.0 | CCL1 | 0.15 | NCL4 | 0.1 | 38 | 0.20 | Good | 19 | 17 | Good |
| Example 9 | ADH1 | 100 | HTP1 | 5.0 | CCL1 | 0.15 | NCL4 | 0.3 | 38 | 0.20 | Good | 19 | 14 | Good |
| Example 10 | ADH1 | 100 | HTP1 | 5.0 | CCL1 | 0.15 | NCL4 | 1.0 | 42 | 0.14 | Good | 12 | 6 | Good |
| Example 11 | ADH1 | 100 | HTP1 | 5.0 | CCL1 | 0.12 | NCL4 | 0.5 | 39 | 0.18 | Good | 18 | >24 | Excellent |
| Example 12 | ADH1 | 100 | HTP1 | 5.0 | CCL1 | 0.18 | NCL4 | 0.5 | 39 | 0.14 | Good | 15 | >24 | Excellent |
| Example 13 | ADH2 | 100 | HTP1 | 5.0 | CCL1 | 0.15 | NCL4 | 0.5 | 39 | 0.20 | Good | 17 | >24 | Excellent |
| Example 14 | ADH3 | 100 | HTP1 | 5.0 | CCL1 | 0.15 | NCL4 | 0.5 | 38 | 0.16 | Good | 17 | 11 | Good |

TABLE 2-continued (part by mass in terms of solid content)

| | Adhesive polymer | | High Tg polymer | | Covalent bonding crosslinking agent | | Non-covalent bonding crosslinking agent | | Pressure sensitive adhesive layer Thickness (µm) | Heat-shrinkable property (mm) | Rework-ability | Adhesive force (N/25 mm) | Constant load shear peeling force | |
|---|---|---|---|---|---|---|---|---|---|---|---|---|---|---|
| | Type | (part by mass) | Type | (part by mass) | Type | (part by mass) | Type | (part by mass) | | | | | (hour) | Rating |
| Example 15 | ADH4 | 100 | HTP1 | 5.0 | CCL1 | 0.15 | NCL4 | 0.5 | 38 | 0.18 | Good | 16 | >24 | Excellent |
| Example 16 | ADH1 | 100 | HTP1 | 5.0 | CCL2 | 0.20 | NCL4 | 0.5 | 31 | 0.15 | Good | 14 | 13 | Good |
| Comparative Example 1 | ADH1 | 100 | HTP1 | 5.0 | CCL1 | 0.18 | — | | 38 | 0.18 | Good | 17 | 2 | Poor |

Various modifications of the above embodiments and examples will be apparent to those skilled in the art without departing from the basic principle of the present invention. Also, various modifications and variations of the present invention will be apparent to those skilled in the art without departing from the spirit and scope of the present invention.

The invention claimed is:

1. A transparent solvent-based acrylic pressure-sensitive adhesive agent comprising:
   an adhesive (meth) acrylic polymer having a weight average molecular weight of 350000 or less;
   a high Tg (meth) acrylic polymer having a glass transition temperature of 40° C. or higher;
   a covalent bonding crosslinking agent that can form a covalent bond with the adhesive (meth) acrylic polymer; and
   at least one type of non-covalent bonding crosslinking agent selected from the group consisting of a benzotriazole compound, a piperidyl compound having at least two piperidyl groups, and an aluminum chelate compound.

2. The transparent solvent-based acrylic pressure-sensitive adhesive agent according to claim 1, wherein a solid content is 40 mass % or greater.

3. The transparent solvent-based acrylic pressure-sensitive adhesive agent according to claim 1, wherein the adhesive (meth) acrylic polymer is a carboxy group-containing (meth) acrylic polymer, and the high Tg (meth) acrylic polymer is an amino group-containing (meth) acrylic polymer containing no monomer unit derived from an aromatic vinyl monomer.

4. The transparent solvent-based acrylic pressure-sensitive adhesive agent according to claim 3, the covalent bonding crosslinking agent is at least one type selected from the group consisting of an epoxy crosslinking agent and a bisamide crosslinking agent.

5. The transparent solvent-based acrylic pressure-sensitive adhesive agent according to claim 1, wherein from 1 part by mass to 20 parts by mass of the high Tg (meth) acrylic polymer is contained, per 100 parts by mass of the adhesive (meth) acrylic polymer.

6. The transparent solvent-based acrylic pressure-sensitive adhesive agent according to claim 1, wherein the non-covalent bonding crosslinking agent is at least one type selected from the group consisting of the benzotriazole compound and the piperidyl compound;
   and from 0.1 parts by mass to 15 parts by mass of the non-covalent bonding crosslinking agent is contained, per 100 parts by mass of the adhesive (meth) acrylic polymer.

7. The transparent solvent-based acrylic pressure-sensitive adhesive agent according to claim 1, wherein the non-covalent bonding crosslinking agent is the aluminum chelate compound; and from 0.01 parts by mass to 2 parts by mass of the non-covalent bonding crosslinking agent is contained per 100 parts by mass of the adhesive (meth) acrylic polymer.

8. An adhesive film comprising: a substrate layer and a transparent pressure-sensitive adhesive layer provided on the substrate layer,
   the transparent pressure-sensitive adhesive layer containing
   a reaction product of a transparent solvent-based acrylic pressure-sensitive adhesive agent containing:
   an adhesive (meth) acrylic polymer having a weight average molecular weight of 350000 or less;
   a high Tg (meth) acrylic polymer having a glass transition temperature of 40°° C. or higher;
   a covalent bonding crosslinking agent that can form a covalent bond with the adhesive (meth) acrylic polymer; and
   at least one type of non-covalent bonding crosslinking agent selected from the group consisting of a benzotriazole compound, a piperidyl compound having at least two piperidyl groups, and an aluminum chelate compound.

9. The adhesive film according to claim 8, wherein a thickness of the transparent pressure-sensitive adhesive layer is from 25 µm to 45 µm, and a constant load shear peeling time of the adhesive film is longer than 5 hours under a condition of a temperature of 40°° C. and a load of 1 kg in a case where the adhesive film is adhered to a 25 mm×25 mm adhesion region of an aluminum substrate.

* * * * *